United States Patent [19]
Johnston et al.

[11] Patent Number: 5,926,651
[45] Date of Patent: *Jul. 20, 1999

[54] OUTPUT BUFFER WITH CURRENT PATHS HAVING DIFFERENT CURRENT CARRYING CHARACTERISTICS FOR PROVIDING PROGRAMMABLE SLEW RATE AND SIGNAL STRENGTH

[75] Inventors: Robert J. Johnston, Fair Oaks; Tuong Trieu; Sachidanandan Sambandan, both of Folsom, all of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/508,668

[22] Filed: Jul. 28, 1995

[51] Int. Cl.$^6$ ..................................................... G06F 13/00
[52] U.S. Cl. ............................ 395/872; 395/849; 395/886
[58] Field of Search ................................. 326/21, 27, 66, 326/88, 26, 83, 86; 257/368; 364/46; 307/475; 327/108; 395/250

[56] References Cited

U.S. PATENT DOCUMENTS

| | | | |
|---|---|---|---|
| 3,575,613 | 4/1971 | Ebertin | 326/88 |
| 4,309,630 | 1/1982 | Young, Jr. | 326/25 |
| 4,453,095 | 6/1984 | Wrathall | 326/66 |
| 4,985,644 | 1/1991 | Okihara et al. | 326/27 |
| 5,097,152 | 3/1992 | Kohda et al. | 307/475 |
| 5,121,000 | 6/1992 | Naghshineh | 326/33 |
| 5,146,306 | 9/1992 | Ferry et al. | 257/368 |
| 5,218,239 | 6/1993 | Boomer | 326/27 |
| 5,220,209 | 6/1993 | Seymour | 326/27 |
| 5,221,865 | 6/1993 | Phillips et al. | 326/86 |
| 5,248,906 | 9/1993 | Mahmood | 326/27 |
| 5,294,845 | 3/1994 | McMahan et al. | 326/21 |
| 5,315,174 | 5/1994 | Chang et al. | 326/27 |
| 5,321,319 | 6/1994 | Mahmood | 326/86 |
| 5,444,406 | 8/1995 | Horne | 327/277 |
| 5,483,188 | 1/1996 | Frodsham | 327/170 |
| 5,489,862 | 2/1996 | Risinger et al. | 327/108 |
| 5,519,338 | 5/1996 | Campbell et al. | 326/27 |
| 5,537,070 | 7/1996 | Risinger | 327/170 |
| 5,543,976 | 8/1996 | Dayton et al. | 364/46 |
| 5,548,229 | 8/1996 | Segawa et al. | 326/57 |
| 5,619,147 | 4/1997 | Hunley | 326/26 |
| 5,621,335 | 4/1997 | Andresen | 326/30 |
| 5,623,216 | 4/1997 | Penza et al. | 326/27 |
| 5,663,664 | 9/1997 | Schnizlein | 326/83 |
| 5,727,166 | 3/1998 | Klinck | 395/250 |

*Primary Examiner*—Thomas C. Lee
*Assistant Examiner*—Chien Yuan
*Attorney, Agent, or Firm*—Blakely, Sokoloff, Taylor & Zafman

[57] ABSTRACT

An output buffer circuit including different arrangements of output devices selectable by circuitry which tests the load characteristics to provide different buffer drive strengths, and different paths having different current carrying characteristics for enabling the output devices selectable by the circuitry which tests the load characteristics to vary the slew rate of the output devices to best match the load.

20 Claims, 3 Drawing Sheets

OUTPUT BUFFER WITH CURRENT PATHS HAVING DIFFERENT CURRENT CARRYING CHARACTERISTICS FOR PROVIDING PROGRAMMABLE SLEW RATE AND SIGNAL STRENGTH

BACKGROUND OF THE INVENTION

1. Field of the Invention

This invention relates to electronic circuitry and, more particularly, to methods and apparatus for providing for electronic circuits an output buffer having programmable slew rate and strength characteristics.

2. History of the Prior Art

Buffer circuits are used at the output of electronic circuits to produce two-valued output signals for transfer to other electronic circuits. The two values are usually provided by using transistor devices to switch voltage levels from two different sources to the output terminals. Two characteristics of buffer circuits are slew rate (sometimes called edge rate) and buffer drive strength. The slew rate of a buffer is the rate of change of a voltage signal furnished at the output terminal of the buffer with respect to time. The buffer drive strength is the current/voltage characteristic of an output device of the buffer in producing the particular voltage level of an output signal. An output device of a weak buffer will transfer little current for a particular unbalanced output load in comparison to the current transferred by a strong buffer to the same load.

The drive strength of the buffer and the slew rate are chosen to meet the characteristics of the circuitry with which the buffer is associated. If, for example, the output signal is furnished to an output load having one impedance level, then the buffer strength and slew rate may be chosen to fit those characteristics. If the output signal is furnished to an output load having a different impedance level, then the buffer strength and slew rate may be chosen to fit those different characteristics. If the buffer strength is not suited to the load impedance, then the circuit timing may be affected to the detriment of operations, the system may operate too slowly, or the circuit may consume too much power. If the slew rate is not suited to the load impedance, circuit timing may be affected; and, in certain circumstances, certain frequency components of the output signal may reflect along the signal paths causing signal ringing along the circuit traces.

Although manufacturers generally chose buffer drive strength and slew rate values adapted to best match expected output loads, users often change the loads significantly from the design values rendering the drive strengths and slew rates inappropriate. For example, a user may easily change the amount of dynamic random access memory in main memory of a computer system thereby varying the output load of circuits furnishing signals to memory.

It is desirable to provide output buffer circuitry adapted to match the characteristics of whatever output load a user may provide even though that load has been varied from designed values.

SUMMARY OF THE INVENTION

It is, therefore, an object of the present invention to provide apparatus and a method for adjusting the strength and slew rate of output buffer circuitry to match the load provided.

It is another object of the present invention to provide self programming output buffer circuitry which adapts to the output characteristics presented by the load.

These and other objects of the present invention are realized by an output buffer circuit which includes circuitry able to respond to different load conditions for the buffer circuit by varying both the buffer drive strength and the slew rate to match the characteristics provided by the load. In one embodiment, different arrangements of output devices are selectable by circuitry which tests the load characteristics to provide different buffer drive strengths. Different paths having different current carrying characteristics are also selectable by the circuitry which tests the load characteristics to vary the slew rate of the output devices to best match the load.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

In this specification, a signal which includes a "#" in its name is considered to be an active low signal. The term "assert" as applied to a signal indicates that signal is active independent of whether the level of the signal is low or high. The term "de-assert" indicates that a signal is inactive.

DETAILED DESCRIPTION

Figure 1:
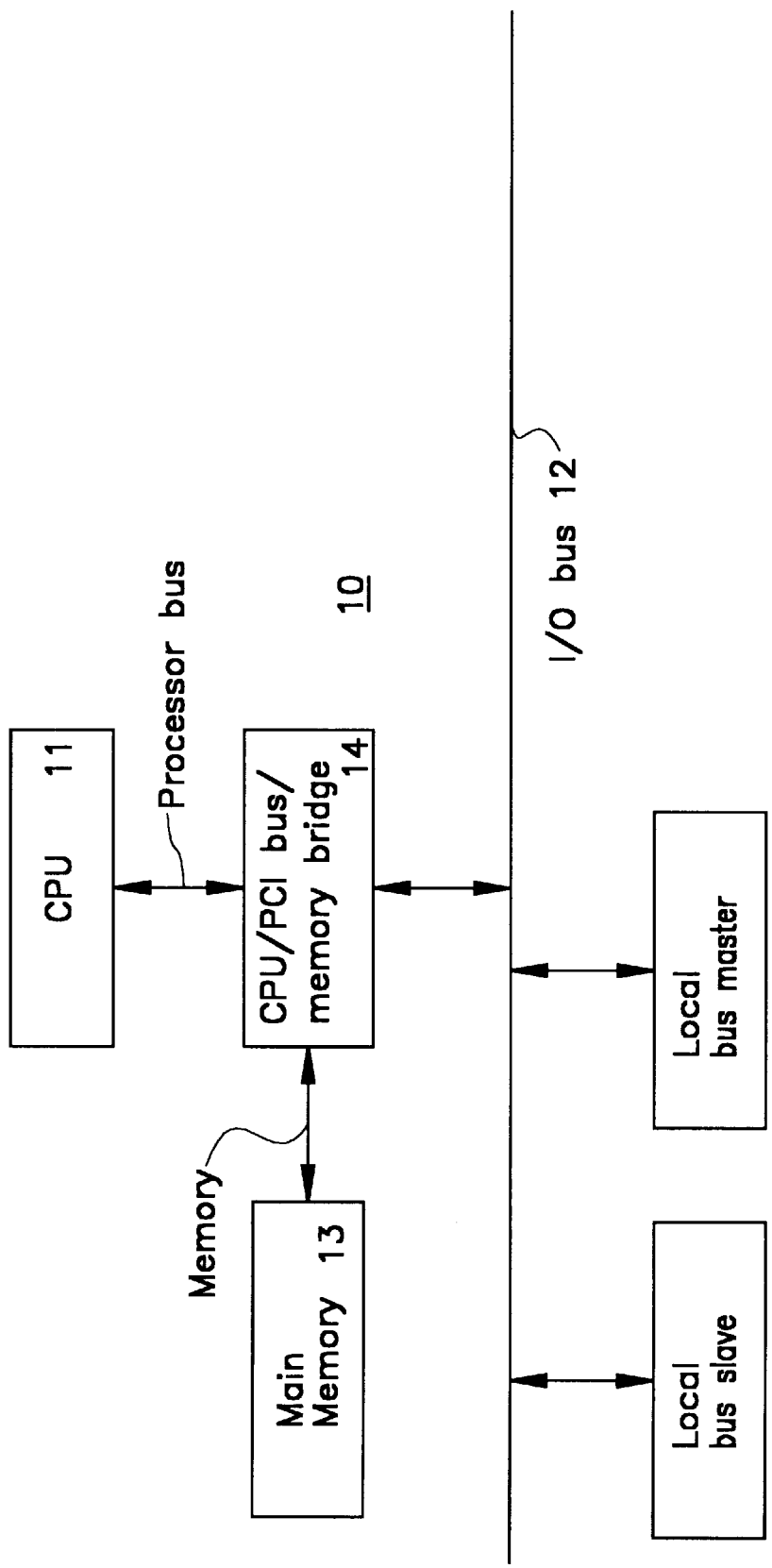
FIG. 1 is a block diagram of a digital system designed in accordance with the present invention.

Referring now to FIG. 1, there is illustrated a block diagram of a digital system 10 configured in accordance with one embodiment of the present invention. The present invention has application in any system, including a computer system, utilizing circuitry in which a buffer output is provided from some specific portion of the system such as an input/output device to other portions of the system. The system 10 illustrated includes a central processing unit 11 which executes the various instructions provided to control the operations of the system 10. The central processing unit 11 is typically joined by a processor bus to a bridge circuit 14 which controls access to an input/output bus 12 adapted to carry information between the various components of the system 10. The bridge 14 is also typically joined by a memory bus to main memory 13 which is typically constructed of dynamic random access memory arranged in a manner well known to those skilled in the prior art to store information during a period in which power is provided to the system 10. In FIG. 1, the bus 12 is preferably a peripheral component interface (PCI) bus or other local bus adapted to provide especially fast transfers of data. In a typical system 10, various input/output devices are connected as bus master and bus slave circuits to the bus 12. Any of these bus master or bus slave circuits, as well as other components of the system, may include the present invention.

Figure 2:
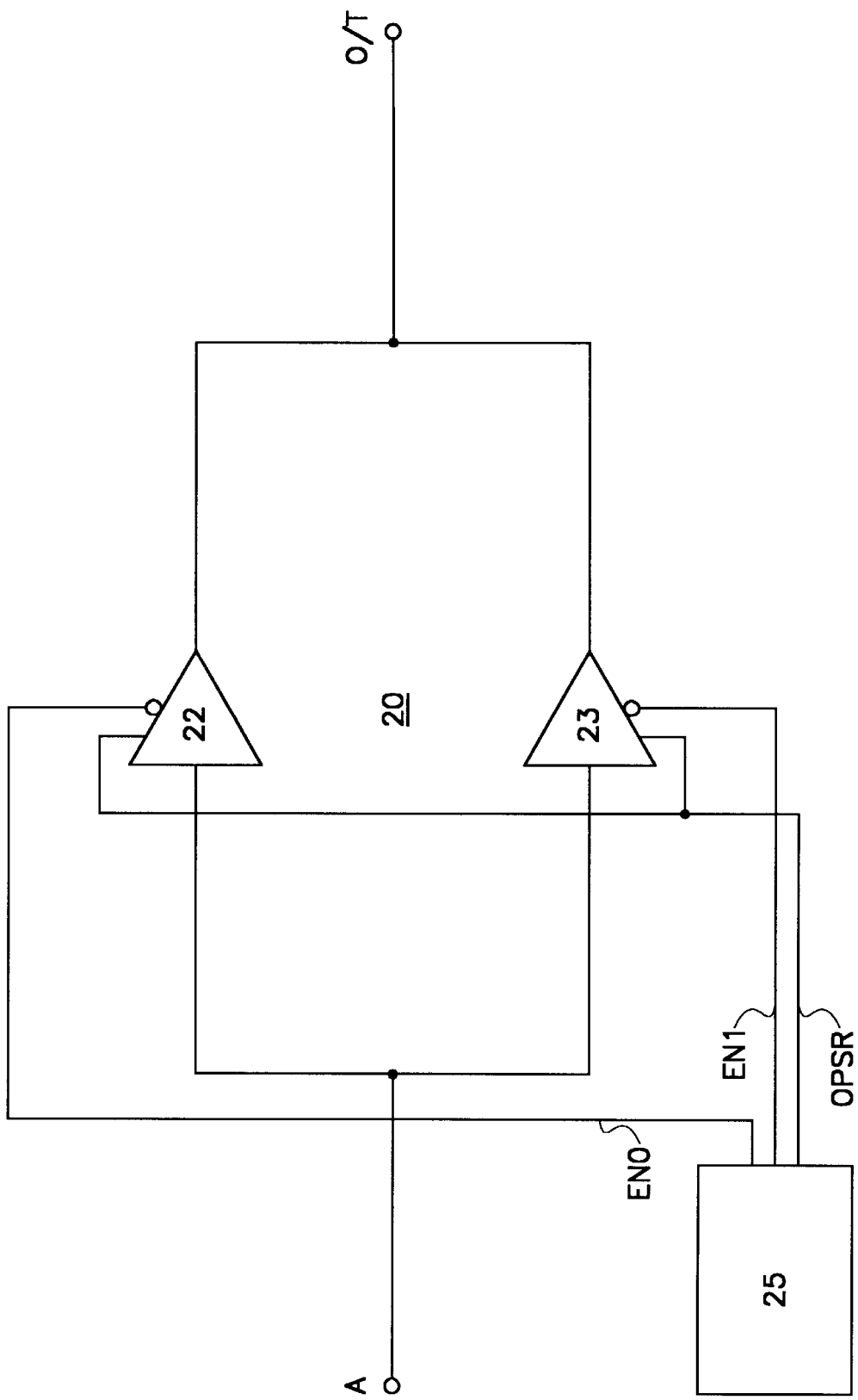
FIG. 2 is a block diagram describing in general detail the operation of the present invention.

Referring now to FIG. 2, there is shown a circuit 20. The circuit 20 includes first and second buffers 22 and 23 which are arranged to transfer a data signal provided at a node A to an output terminal O/T. The buffers 22 and 23 are individually enabled by a logic circuit 25. When a buffer is enabled, the signal furnished at terminal A is transferred by that buffer to the output terminal O/T. In one embodiment, the circuit 25 tests various circuit values within the system 10 and determines from those values the optimum values for buffer drive strength and slew rate for furnishing the signals provided at node A to the terminal O/T. For example, the logic circuitry may test the amount of random access memory which is included in main memory within the system. The value of random access memory included in the system is a measure of load impedance and provides a set of conditions which influence the values of buffer drive strength and slew rate. With the value of system memory known, the logic circuit 25 furnishes enabling signals to buffer 22, buffer 23, or both buffers 22 and 23. Those skilled in the art will see that this provides three individual sets of buffer drive strengths which may be selected for transferring the signals from node A to terminal O/T. By judicious selection of the impedance values of the circuitry of the buffers 22 and 23, these drive strengths may be made to cover the ranges of values to be expected within the operating ranges of a system 10.

Figure 3:
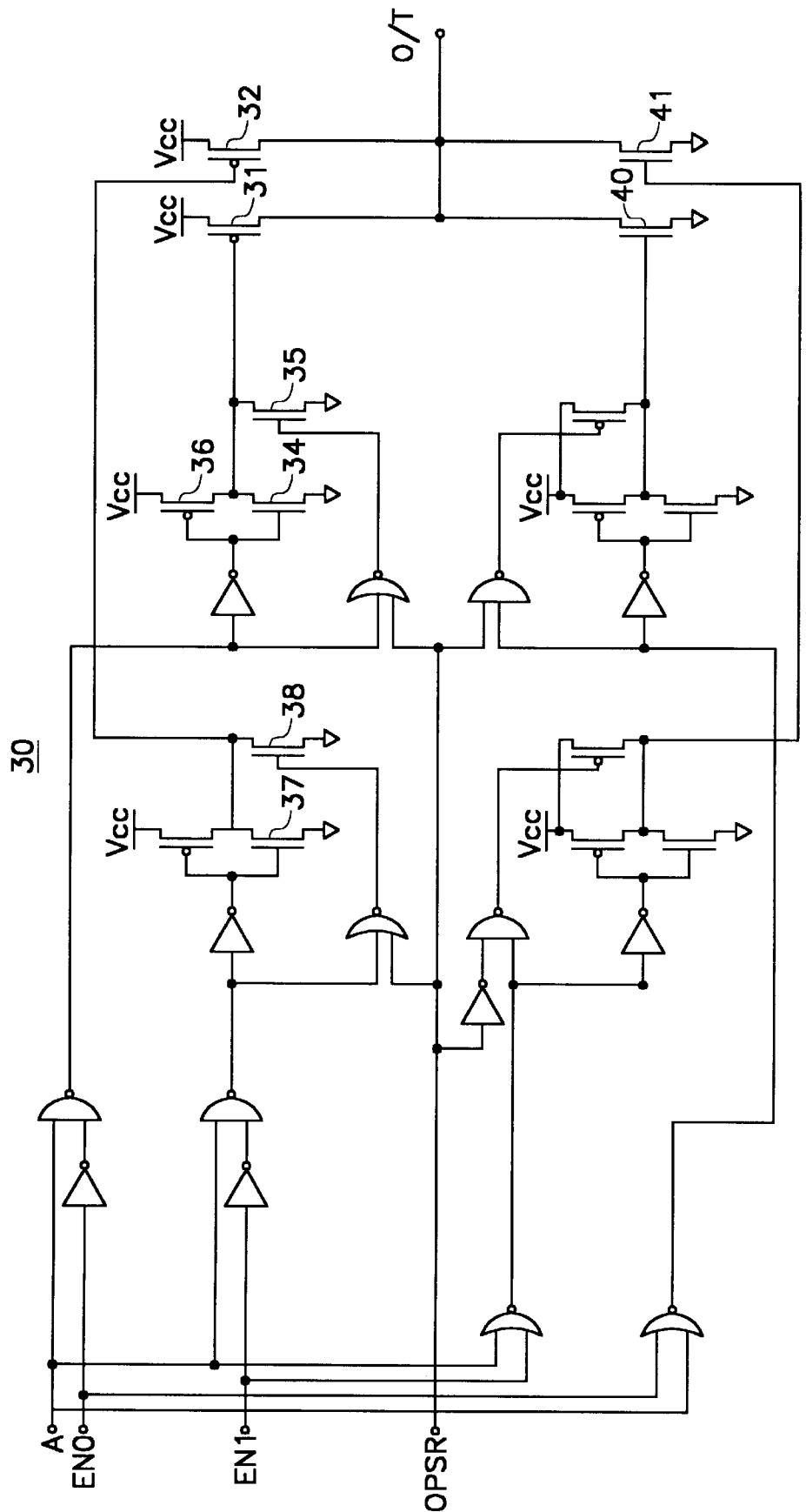
FIG. 3 is a circuit diagram illustrating a specific embodiment of the invention described generally in FIG. 2.

FIG. 3 illustrates one embodiment of circuitry for providing the advantages described above. In FIG. 3 is illustrated a buffer circuit 30 which includes a pair of P channel field effect transistors output devices 31 and 32. The transistor devices 31 and 32 are selected to provide different sized current paths between an output terminal O/T and a source of voltage Vcc. Typically this is accomplished by providing transistors having different channel widths for the same channel length. In one embodiment, a number of individual identical P channel devices are joined in parallel to form each of the devices 31 and 32. In a special arrangement of this embodiment, the device 31 is physically constructed of twelve individual devices while the device 32 is physically constructed of four individual devices; all of the individual devices included in each of the general devices 31 and 32 are identical. Thus, the device 31 provides a path which carries three times the current as is carried by the device 32.

The devices 31 and 32 are separately enabled so that either one or both of the devices may be selected. This provides three individual current paths of different sizes for transferring signals to the terminal O/T. With the values described above, current paths having widths of four, twelve, or sixteen individual transistor devices may be selected to provide different strengths from the buffer circuit 30. It will be understood that additional output devices providing additional current paths could be provided to allow the selection of other values of buffer strengths for the circuit 30.

Enabling signals are provided to the device 31 through one or both of a pair of N type transistor devices 34 and 35. If the device 34 is enabled and a P type device 36 is disabled, a low value is provided at the gate terminal of the device 31 to enable that device. If the device 35 is also enabled, then a low value is furnished through both the device 34 and the device 35. This larger current path allows the voltage at the gate of the device 31 to be brought low much more rapidly than when only the device 34 is enabled. Thus, the slew rate, the rate at which the terminal reaches a low value, is varied by the choice of the devices 34 and 35 to enable. As will be seen, the device 34 is enabled when a high valued input signal appears at an input terminal A and a low valued enabling signal EN0 appears at a control terminal. Both the signal EN0 and the addition of an enabling signal OPSR are required with the high valued input signal to cause both of the devices 34 and 35 to be enabled.

Similarly, a circuit including N type devices 37 and 38 identical to the circuit including the devices 34 and 35 turns on the device 32 selects the slew rate (edge rate) by which the device 32 is enabled. In contrast to the devices 34 and 35, the device 37 is enabled by a signal EN1 while the devices 37 and 38 are enabled by the signal EN1 and the signal OPSR together. If output devices in addition to the devices 31 and 32 are included to provide additional buffer strengths, then additional devices such as the devices 34 and 35 may be provided for slew rate control for such additional output devices.

It will be understood that the signals EN0, EN1, and OPSR are produced as a result of the test conducted by the logic circuit of FIG. 2 to determine the specific system characteristics such as load impedance which control the optimum values of buffer strength and slew rate. As pointed out, this may be a result of determining the amount of random access memory available in main memory at the time power is applied to the system.

In addition to the positive output values provided through the transistor devices 31 and 32 in the manner explained, a similar pair of N channel output devices 40 and 41 are joined to respond to opposite valued input signals furnished at the input terminal A and enabling signals EN0, EN1, and OPSR furnished at the control terminals.

Thus it will be seen that three possible buffer strengths may be selected in response to the signals EN0 and EN1. Moreover, each of the strengths may be obtained through a controlled slew rate determined in response to the signal OPSR. This allows a wide range of adjustments to be automatically made in response to various circuit characteristics in situations in which no variations has been possible before this invention. As was pointed out above, additional output devices may be added to provide a wider selection of buffer strengths which may be automatically selected.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An output buffer circuit comprising
   a logic circuit for calculating a load impedance;
   a plurality of switching devices for connecting a voltage to an output terminal; and
   circuitry for enabling selected ones of the plurality of switching devices in accordance with a logic signal from the logic circuit, the selected ones of the plurality of switching devices selected in accordance with the load impedance to control slew rate and signal strength;
   a plurality of different current paths having different current carrying characteristics for providing a slew rate for the switching devices in response to the logic circuit indicating the load impedance.

2. An output buffer circuit as claimed in claim 1 in which the devices of the plurality of switching devices are field effect transistor devices.

3. An output buffer circuit as claimed in claim 1 in which the devices of the plurality of switching devices comprises two devices, and the devices can be enabled individually or together.

4. An output buffer circuit as claimed in claim 3 in which each of the two devices of each of the plurality of switching devices includes a number of identical field effect transistor devices joined in parallel.

5. An output buffer circuit as claimed in claim 1 in which the devices of the plurality of switching devices each comprise more than two devices, and the devices can be selectively enabled.

6. An output buffer circuit for furnishing signals to a load comprising:
   means for detecting different load conditions;
   an output device for providing an output signal to the load; and
   means for varying buffer drive strength and slew rate of the output devices in response to the different load conditions for the buffer circuit, the means for varying slew rate comprising a plurality of different current paths having different current carrying characteristics, and means for testing load characteristics to provide signals to select ones of the current paths;
   wherein the slew rate for the output devices is selected to match characteristics provided by the load.

7. An output buffer circuit as claimed in claim 6 in which the means for detecting comprises means for testing characteristics of the load to provide different buffer drive strengths and slew rates.

8. An output buffer circuit as claimed in claim 6 in which the output devices comprise a plurality of field effect transistor devices joined in parallel to an output terminal, and in which the means for varying buffer drive strength and slew rate comprises means for enabling different ones of the plurality of the field effect transistor devices.

9. An output buffer circuit as claimed in claim 1 in which the plurality of different current paths comprise transistor field effect devices joined in parallel and having different current carrying characteristics.

10. A computer system comprising:
    a central processing unit,
    main memory unit,
    a bus unit,
    a plurality of peripheral component units associated with the central processing unit on the bus unit,
    at least one of the units including an output buffer for furnishing output signals to another of the units,
    the output buffer comprising:
      a logic circuit for determining load impedance;
      a first plurality of switching devices for connecting a voltage of a first level to an output terminal,
      a second plurality of switching devices for connecting a voltage of a second level to the output terminal, and
      circuitry for enabling selected ones of the plurality of switching devices in response to output signals, the selected ones of the first and second plurality of switching devices selected to in response to the load impedance to control slew rate and signal strength,
      a plurality of different current paths generated by the selected ones of the plurality of switching devices, the current paths having different current carrying characteristics for providing a slew rate in response to the logic circuit indicating the load impedance.

11. A computer system as claimed in claim 10 in which the devices of the first and second plurality of switching devices are field effect transistor devices.

12. A computer system as claimed in claim 10 in which the devices of the first and second plurality of switching devices each comprise two devices, and the devices can be enabled individually or together.

13. A computer system as claimed in claim 12 in which each of the two devices of each of the first and second plurality of switching devices includes a number of identical field effect transistor devices joined in parallel.

14. A computer system as claimed in claim 10 in which the devices of the first and second plurality of switching devices each comprise more than two devices, and the devices can be selectively enabled.

15. A system including an output buffer circuit for furnishing signals to a load comprising:
    an output device for providing output signals to the load;
    logic circuitry for testing an amount of memory in the system; and
    means for varying buffer drive strength of the output devices in response to a logic signal indicating the amount of memory in the system; and
    means for providing a slew rate for the output devices in response to the logic signal indicating the amount of memory in the system, the means comprising a plurality of different current paths having different current carrying characteristics.

16. An system as claimed in claim 15 in which the output devices comprise a plurality of field effect transistor devices joined in parallel to an output terminal.

17. A system as claimed in claim 16, in which the means for varying buffer drive strength comprises means for enabling different ones of the plurality of the field effect transistor devices.

18. A system including an output buffer circuit for furnishing signals to a load comprising:
    an output device for providing output signals to the load;
    logic circuitry for testing an amount of memory in the system; and
    a plurality of different current paths having different current carrying characteristics for providing a slew rate and a buffer drive strength for the output devices in response to a logic signal from the logic circuitry indicating the amount of memory in the system.

19. The system as claimed in claim 18 in which the output devices comprise a plurality of field effect transistor devices joined in parallel to an output terminal.

20. The system as claimed in claim 19, in which the plurality of different current paths comprise the plurality of the field effect transistor devices that may be selectively enabled to provide the different current carrying characteristics.

* * * * *